(12) United States Patent
Pesetski et al.

(10) Patent No.: US 8,242,799 B2
(45) Date of Patent: Aug. 14, 2012

(54) SYSTEM AND METHOD FOR PHASE ERROR REDUCTION IN QUANTUM SYSTEMS

(75) Inventors: Aaron A. Pesetski, Gambrills, MD (US); James E. Baumgardner, Odenton, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 91 days.

(21) Appl. No.: 12/947,128

(22) Filed: Nov. 16, 2010

(65) Prior Publication Data

US 2012/0124432 A1    May 17, 2012

(51) Int. Cl.
*H03K 19/195*  (2006.01)
(52) U.S. Cl. .................................. 326/1; 326/3
(58) Field of Classification Search .............. 326/1–5; 327/366, 367, 527, 528; 257/14
See application file for complete search history.

(56) References Cited

U.S. PATENT DOCUMENTS

| | | | |
|---|---|---|---|
| 6,441,358 B1 | 8/2002 | Eigler et al. | |
| 6,608,518 B2 * | 8/2003 | Furuta et al. | 327/367 |
| 7,219,018 B2 | 5/2007 | Vitaliano et al. | |
| 7,498,832 B2 * | 3/2009 | Baumgardner et al. | 326/7 |
| 7,714,605 B2 * | 5/2010 | Baumgardner et al. | 326/7 |
| 7,889,992 B1 * | 2/2011 | DiVincenzo et al. | 398/115 |
| 8,138,784 B2 * | 3/2012 | Przybysz et al. | 326/4 |
| 2004/0156407 A1 * | 8/2004 | Beausoleil et al. | 372/43 |
| 2009/0078931 A1 * | 3/2009 | Berkley | 257/31 |
| 2009/0091812 A1 * | 4/2009 | Goto et al. | 359/107 |
| 2009/0267635 A1 * | 10/2009 | Herr et al. | 326/4 |
| 2010/0044600 A1 * | 2/2010 | Ichimura et al. | 250/550 |
| 2010/0061138 A1 * | 3/2010 | Song et al. | 365/106 |

* cited by examiner

*Primary Examiner* — Shawki S Ismail
*Assistant Examiner* — Thienvu Tran
(74) *Attorney, Agent, or Firm* — Tarolli, Sundheim, Covell & Tummino LLP

(57) ABSTRACT

One embodiment of the invention includes a quantum system. The system includes a superconducting qubit that is controlled by a control parameter to manipulate a photon for performing quantum operations. The system also includes a quantum resonator system coupled to the superconducting qubit and which includes a first resonator and a second resonator having approximately equal resonator frequencies. The quantum resonator system can represent a first quantum logic state based on a first physical quantum state of the first and second resonators with respect to storage of the photon and a second quantum logic state based on a second physical quantum state of the first and second resonators with respect to storage of the photon.

20 Claims, 3 Drawing Sheets

SYSTEM AND METHOD FOR PHASE ERROR REDUCTION IN QUANTUM SYSTEMS

TECHNICAL FIELD

The present invention relates generally to quantum computing systems, and specifically to a system and method for phase error reduction in quantum systems.

BACKGROUND

Superconducting qubits can take the form of an oscillator that can transfer energy between some combination of an electric field of a capacitor, a magnetic field of an inductor, and a superconducting phase difference, such as from a Josephson junction. Phase errors can be introduced in a superconducting qubit. As one example, because the superconducting qubit can include a Josephson junction, the difference in energy between the quantum |0> and |1> states can be a function of a current in the Josephson junction that can vary to cause a fluctuation in frequency, and thus phase, in response to noise coupling into the system. As another example, when the energy of the quantum |1> state is greater than the energy of the quantum |0> state, phase always increases in time. Furthermore, timing jitter in the control pulses that are used to perform a gate operation on the superconducting qubit can translate into jitter in the phase of the superconducting qubit as the gate operation is performed.

SUMMARY

One embodiment of the invention includes a quantum system. The system includes a superconducting qubit that is controlled by a control parameter to manipulate a photon for performing quantum operations. The system also includes a quantum resonator system coupled to the superconducting qubit and which includes a first resonator and a second resonator having approximately equal resonator frequencies. The quantum resonator system can represent a first quantum logic state based on a first physical quantum state of the first and second resonators with respect to storage of the photon and a second quantum logic state based on a second physical quantum state of the first and second resonators with respect to storage of the photon.

Another embodiment of the invention includes a method for reducing phase errors in a quantum resonator system. The method includes storing a photon in one of a first resonator and a second resonator of the quantum resonator system. The first and second resonators can have approximately equal resonator frequencies. The method also includes determining that the quantum resonator system represents a first quantum logic state based on the photon being stored in the first resonator of the quantum resonator system. The first and second resonators can have approximately equal resonator frequencies. The method further comprises determining that the quantum resonator system represents a second quantum logic state based on the photon being stored in the second resonator of the quantum resonator system.

Another embodiment of the invention includes a quantum system. The system includes a superconducting qubit that is controlled by a control parameter to manipulate a photon for performing quantum operations. The system also includes a quantum resonator system coupled to the superconducting qubit and which includes a first resonator and a second resonator having approximately equal resonator frequencies. The quantum resonator system can represent a first quantum logic state based on storing the photon in the first resonator and a second quantum logic state based on storing the photon in the second resonator. The quantum resonator system can be configured to periodically swap storage of the photon between the first resonator and the second resonator to substantially mitigate phase errors associated with the quantum resonator system.

DETAILED DESCRIPTION

Figure 1:
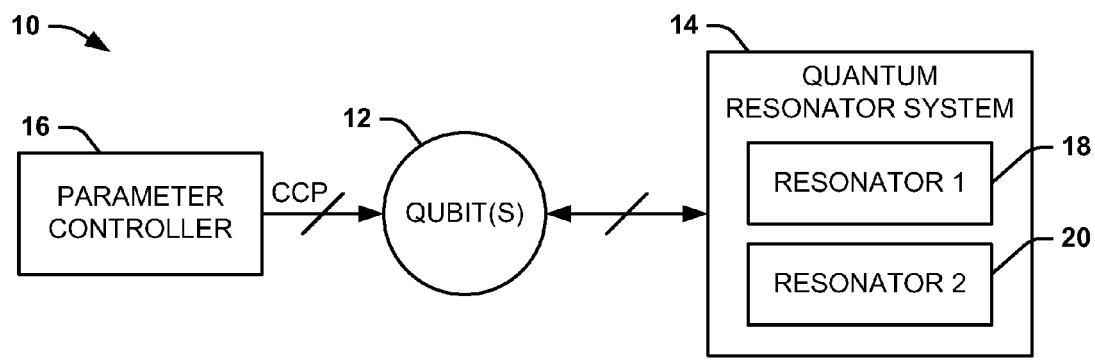
FIG. 1 illustrates an example of a quantum system in accordance with an aspect of the invention.

The present invention relates generally to quantum computing systems, and specifically to a system and method for phase error reduction in quantum systems. In a quantum system, a superconducting qubit is coupled to a quantum resonator system. The superconducting qubit can be configured to manipulate a photon for performing quantum operations in response to a control parameter. As described herein, a photon is defined as a discrete quantum of energy that is not limited to light, but can be used to describe a transferrable unit of energy that defines an energy state of a qubit and/or a resonator. The quantum resonator system includes a pair of resonators of approximately equal frequency, such that the superconducting qubit can transfer the photon to a specific one of the resonators to encode one of two quantum logic states. Thus, the two quantum logic states can be represented based on which of the two respective resonators stores the photon with the other resonator not storing a photon.

Specifically, the pair of resonators can include a first resonator and a second resonator. A first quantum logic state (e.g., $|1>_L$) can be represented by a first physical quantum state of the first and second resonators with respect to a single photon. As an example, the first physical quantum state of the first and second resonators can correspond to the first resonator storing the photon with the second resonator not storing a photon (e.g., $|10>_P$). Similarly, the second quantum logic state (e.g., $|0>_L$) can be represented by a second physical quantum state of the first and second resonators with respect to a single photon. As an example, the second physical quantum state of the first and second resonators can correspond to the second resonator storing the photon with the first resonator not storing a photon (e.g., $|01>_P$).

As described herein, in ket notations denoting a given quantum logic state, a subscript "L" indicates the quantum logic state (i.e., either a |1> or a |0>) that the combination of resonators in the quantum resonator system collectively store. Also as described herein, in ket notations denoting a physical quantum state of a resonator or resonators, a subscript "P" indicates the quantum state or quantum information that is stored in a given resonator or set of resonators based on the presence or absence of a photon. Therefore, in the above example, when the first resonator stores a photon (i.e., $|1>_P$) and the second resonator is in the ground state and thus does not store a photon (i.e., $|0>_P$), the resonators can collectively be expressed by the ket notation $|10>_P$ which can correspond to the quantum logic state $|1>_L$. Similarly, in the above example, when the second resonator stores a photon and the first resonator does not store a photon, the resonators can collectively be expressed by the ket notation $|01>_P$ which can correspond to the quantum logic state $|0>_L$.

In addition, it is to be understood that the physical quantum state of the first and second resonators with respect to the single photon is not limited to the physical quantum states $|10>_P$ and $|01>_P$, defined respectively by the photon strictly occupying either the first or the second resonator, but could instead include linear superpositions of physical quantum states of the first and second resonators with respect to the single photon. Specifically, the quantum logic state $|1>_L$ can represent the physical quantum state $\alpha|10>_P+\beta|01>_P$ and the quantum logic state $|0>_L$ can represent the physical quantum state $\beta|10>_P-\alpha|01>_P$, which are each linear superpositions of the single photon in the first and second resonator. The coefficients "$\alpha$" and "$\beta$" are amplitudes of the linear superposition terms (e.g., $1/\sqrt{2}$). Furthermore, the pair of resonators may not have a specific quantum logic state, such as $|1>_L$ or $|0>_L$, but may instead have a quantum logic state that is a linear superposition of the two defined quantum logic states. Specifically, the pair of resonators can typically occupy the quantum logic state $|\Psi>=\gamma|1>_L+\delta|0>_L$ which corresponds to the physical quantum state $|\Psi>=\gamma|1>_L+\delta|0>_L=(\gamma\alpha+\delta\beta)|10>_P+(\gamma\beta-\delta\alpha)|01>_P$. Thus, as described herein, the quantum logic states $|1>_L$ and $|0>_L$ can represent linear superposition quantum logic states $\alpha|1>_L+\beta|0>_L$ and $\beta|1>_L-\alpha|0>_L$, respectively.

The use of two resonators with approximately equal frequencies to encode a single quantum logic state can substantially mitigate timing jitter in control signals by substantially mitigating time evolution of the quantum information in the two resonators relative to each other. Specifically, because each of the quantum logic states includes a single photon, the phase of each quantum logic state will increases at a rate equal to the frequency difference between the two resonators. However, because the resonators have approximately equal frequencies, the relative phase between the two resonators is substantially constant in time, resulting in timing errors in the gates used to manipulate the quantum information introducing substantially no phase errors.

In addition, the quantum resonator system can be configured to periodically swap the quantum information between the pair of resonators. As an example, the quantum resonator system can include a controller and a clock. The clock can be configured to set a frequency at which the periodic swapping of the quantum information between the resonators can occur. The controller can thus track the storage of the photon between the pair of resonators to maintain the respective representation of one of the first and second quantum logic states. Specifically, the controller can initially identify that the ket notation $|10>_P$ corresponds to the quantum logic state $|1>_L$. However, after the quantum information is swapped between the two resonators, the controller can subsequently identify that the ket notation $|01>_P$ corresponds to the quantum logic state $|1>_L$. The periodic swapping of the photon between the two resonators can thus substantially mitigate phase errors resulting from a slight mismatch in frequency between the two resonators in the quantum resonator system.

FIG. 1 illustrates a quantum system 10 in accordance with an aspect of the invention. The quantum system 10 can be implemented in any of a variety of quantum and/or classical computing environments, such as in or as part of a quantum processor. The quantum system 10 includes one or more superconducting qubits 12 that are coupled to a quantum resonator system 14. As an example, the qubit(s) 12 can each include an arrangement of an inductor, a capacitor, and a Josephson junction, and can be configured as one of a flux, phase, or charge qubit.

The qubit(s) 12 and the quantum resonator system 14 can collectively be configured to manipulate a photon to perform one or more quantum gate operations. Specifically, the qubit(s) 12 can be configured to manipulate the photon between the qubit(s) 12 and the quantum resonator system 14 in response to adjustment of a control parameter. In the example of FIG. 1, the quantum system 10 includes a parameter controller 16 that generates one or more respective signals CCP. As an example, the signal(s) CCP can control any of a variety of classical control parameters, such as a current, generated by the parameter controller 16 that can adjust a frequency of the qubit(s) 12. Thus, the signal(s) CCP can adjust the frequency of the qubit(s) 12 to transfer (i.e., create and/or destroy) the photon between itself and the quantum resonator system 14 in a variety of ways to perform the quantum gate operations.

The quantum resonator system 14 includes a first resonator 18 and a second resonator 20. The first and second resonators 18 and 20 can be configured as any of a variety of resonators. As an example, the first and second resonators 18 and 20 can be configured as transmission line resonators, lumped element resonators, distributed resonators, or a combination thereof. As another example, the first and second resonators 18 and 20 can be formed from a coplanar, strip line, microstrip, slot line, or coaxial waveguide comprising a capacitive or inductive gap at each respective end. The first and second resonators 18 and 20 have a frequency that is approximately equal with respect to each other (e.g., 10 GHz). Thus, at a given time, either one of the first and second resonators 18 and 20 can store the photon that is provided by the qubit(s) 12 in substantially the same manner to preserve the quantum information that is provided by the photon. As a result, the first and second resonators 18 and 20 can collectively represent one of two quantum logic states based on in which of the first and second resonators 18 and 20 the photon is stored.

As an example, a first quantum logic state $|1>_L$ can represent a first physical quantum state associated with the first and second resonators 18 and 20 with respect to a single photon. For example, the first physical quantum state can be the physical quantum state $|10>_P$, in which the first resonator 18 stores a photon and the second resonator 20 does not store a photon. Similarly, a second quantum logic state $|0>_L$ can represent a second physical quantum state associated with the first and second resonators 18 and 20 with respect to a single photon. For example, the second physical quantum state can be the physical quantum state $|01>_P$, in which the second resonator 20 stores a photon and the first resonator 18 does not store a photon. Therefore, instead of performing quantum operations between the qubit(s) 12 and a single resonator, in which the physical quantum states of including a photon (i.e., $|1>_P$) and not including a photon (i.e., $|0>_P$) are equivalent to the quantum logic states $|1>_L$ and $|0>_L$, respectively, the quantum resonator system 14 can always include a single photon to represent either of the quantum logic states $|1>_L$ and $|0>_L$.

The use of both the first and second resonators 18 and 20 having approximately equal frequencies to encode the quantum logic states $|1>_L$ and $|0>_L$ with a single photon can substantially mitigate phase errors in the quantum system 10. Specifically, timing jitter in the signal(s) CCP is substantially mitigated based on the first and second resonators 18 and 20 being approximately the same frequency and based on the each of the quantum logic states $|1>_L$ and $|0>_L$ including a single photon. In a single resonator quantum system, when the energy of a quantum $|1>$ state is greater than the energy of the quantum $|0>$ state, phase always increases in time. By contrast, in the quantum resonator system 14, the phase of each of the quantum logic states $|1>_L$ and $|0>_L$ increases at a rate equal to the frequency difference between the first and second resonators 18 and 20, which is approximately zero. Therefore, the relative phase between the first and second resonators 18 and 20 is substantially constant in time, resulting in timing errors in the manipulation of the qubit(s) 12 by the signal(s) CCP introducing substantially no phase errors.

As an example, in a single resonator quantum system, a 10 GHz resonator configured as a transmission line resonator can have a length of approximately 10 millimeters. Using standard photolithography techniques, the length of the resonator can be controlled to about 100 nanometers, thus ensuring that the frequency is accurate to approximately one part in $10^5$. Therefore, the phase of the physical quantum state $|1>_P$, and thus likewise the quantum logic state $|1>_L$ based on the quantum system being a single resonator quantum system, would increase relative to the phase of the physical quantum state $|0>_P$, and thus the quantum logic state $|0>_L$, at a rate of approximately $2\pi*10$ GHz. Therefore, if a control signal manipulating the associated qubit had a timing jitter of approximately 100 picoseconds, it would introduce a phase error of approximately $2*\pi$ (i.e., one complete cycle). However, in the quantum system 10, the first and second resonators 18 and 20 can be frequency matched to better than approximately one part in $10^5$ (i.e., 100 kHz). Therefore, the relative phase increase between the physical quantum state $|10>_P$ (i.e., the quantum logic state $|1>_L$) and the physical quantum state $|01>_P$ (i.e., the quantum logic state $|0>_L$) would thus be less than approximately $2\pi*100$ kHz. Accordingly, a timing jitter in the signal(s) CCP would introduce a significantly mitigated phase error of approximately $2\pi*10^{-5}$ radians.

While the first and second resonators 18 and 20 can be fabricated to have approximately the same frequency, as indicated above, exact frequency matching of the first and second resonators 18 and 20 during fabrication can be highly unlikely. Therefore, to substantially mitigate phase errors that can result from a mismatch in frequency between the first and second resonators 18 and 20, the quantum resonator system 14 can be configured to periodically perform a logical X-gate operation to swap quantum information between the first and second resonators 18 and 20. Specifically, the logical X-gate operation can swap storage of the photon between the first and second resonators 18 and 20, such that the physical quantum states of the first and second resonators 18 and 20 are reversed (i.e., $|10>_P \rightarrow |01>_P$ or $|01>_P \rightarrow |10>_P$). As an example, the qubit(s) 12 can be involved in the logical X-gate operation, along with, for example, one or more additional superconducting qubits in the quantum resonator system 14. As a result, an increasing phase error based on the frequency mismatch between the first and second resonators 18 and 20 can be substantially reversed upon swapping the quantum information between the first and second resonators 18 and 20.

As an example, the first and second resonators 18 and 20 can each have a frequency of approximately 10 GHz. A frequency mismatch between the first and second resonators 18 and 20 can cause a phase error to evolve at a rate of approximately $2\pi*100$ kHz, as described above. Thus, as an example, the quantum resonator system 14 can perform the logical X-gate operation at a frequency of approximately 50 MHz. The phase error of the quantum resonator system 14 thus evolves at a positive rate for approximately 20 nanoseconds to a value of approximately $4\pi*10^{-3}$ radians, the reverses after the logical X-gate operation at a negative rate back to approximately zero. If the phase error then evolves at the negative rate past zero, the logical X-gate operation occurs once again to reverse the phase error accumulation at the positive rate. In the example of the qubit(s) 12 being included in the logical X-gate operation, a timing jitter in the signal(s) CCP of approximately 100 picoseconds would result in a phase error of less than $20\pi*10^{-6}$ radians per logical X-gate, and could thus accumulate a maximum phase error of approximately $2\pi*500$ Hz, even in the presence of noise sources in an associated clock.

The quantum resonator system 14 can be configured to track the storage of the photon between the first and second resonators 18 and 20 to maintain a given quantum logic state regardless of in which of the first and second resonators 18 and 20 the photon is stored. Specifically, upon performing a first logical X-gate operation, the photon is swapped from the first resonator 18 to the second resonator 20 (i.e., $|10>_P \rightarrow |01>_P$). However, such a swap of the photon is not intended to change the quantum logic state (e.g., $|1>_L$) that is encoded by the quantum resonator system 14. Therefore, after the logical X-gate operation, the quantum resonator system 14 can set the physical quantum state $|01>_P$ to correspond to the quantum logic state $|1>_L$ for purposes of subsequent quantum operations associated with the quantum system 10. Accordingly, the quantum resonator system 14 can track the storage of the photon between the first and second resonators 18 and 20 for all subsequent X-gate operations, such that the quantum resonator system 14 can maintain the encoding of the quantum logic state $|1>_L$ regardless of which of the first and second resonators 18 and 20 store the photon.

In addition, the qubit(s) 12 can be coupled to the quantum resonator system 14 in a variety of ways. As an example, the qubit(s) 12 can be a single qubit coupled to one of the first and second resonators 18 and 20, such that the photon can be transferred between the qubit 12 and the one of the first and second resonators 18 and 20. As an example, the qubit 12 can be coupled to the first resonator 18, such that the qubit 12 could transfer the photon to the first resonator 18 to achieve the physical quantum state $|10>_P$, and thus encode the quantum logic state $|1>_L$. To instead encode the quantum logic state $|0>_L$, the quantum resonator system 14 could simply perform the logical X-gate operation, such as via an additional qubit, to swap storage of the photon from the first resonator 18 to the second resonator 20 (i.e., $|10>_P \rightarrow |01>_P$) after the photon is transferred to the first resonator 18. As another example, the qubit(s) 12 can be two separate qubits, each coupled respectively to one of the resonators 18 and 20, to transfer the photon to a respective one of the resonators 18 and 20 in response to respective separate control signals, such as including the signal(s) CCP. As yet another example, the qubit(s) 12 can be coupled to one or more interposing resonators and/or qubits in the quantum resonator system 14 that allow manipulation of the photon between the resonators 18 and 20.

Figure 2:
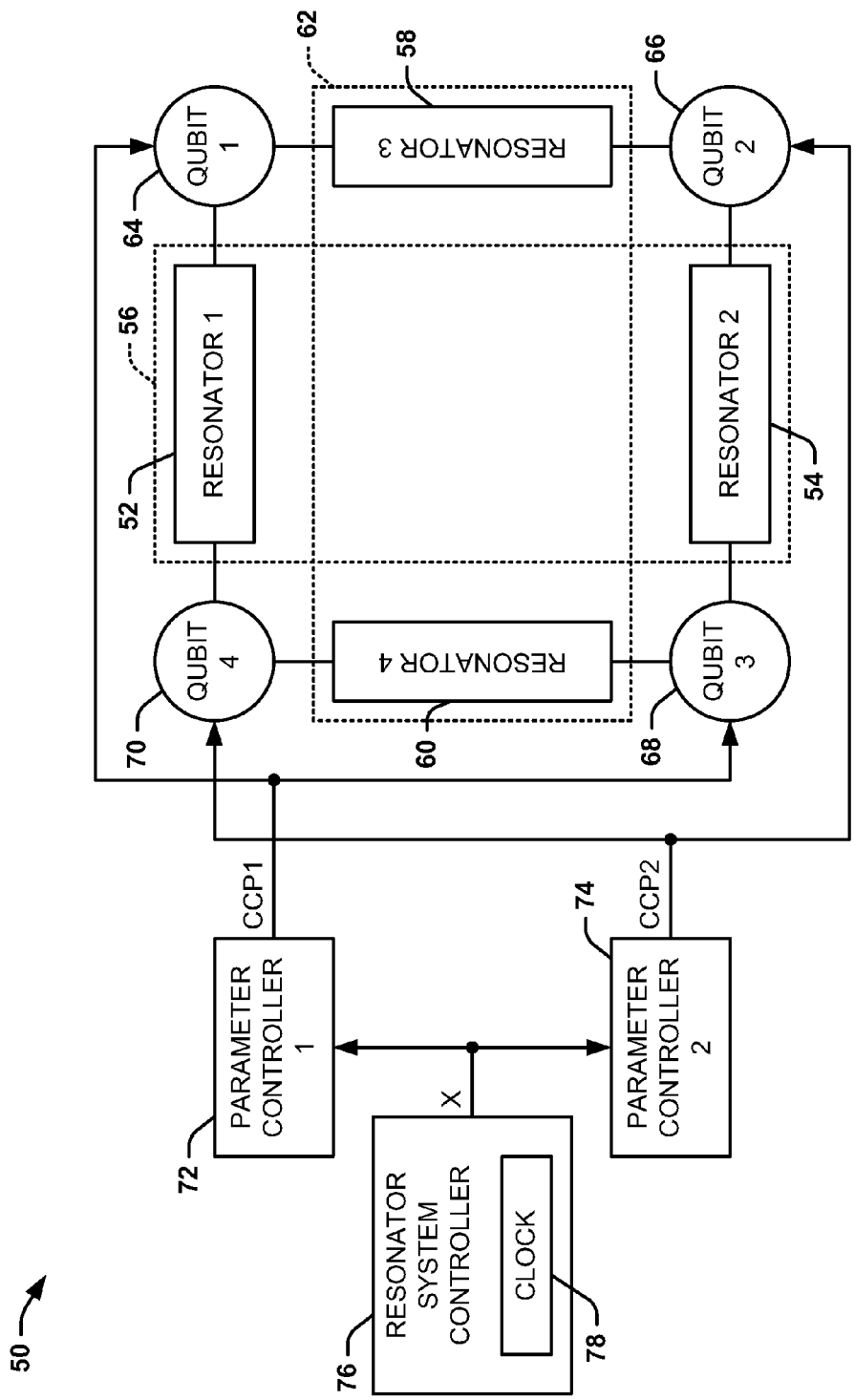
FIG. 2 illustrates an example of a quantum resonator system in accordance with an aspect of the invention.

FIG. 2 illustrates an example of a quantum resonator system 50 in accordance with an aspect of the invention. The quantum resonator system 50 can correspond to the quantum resonator system 14 in the example of FIG. 1. Therefore, reference is to be made to the example of FIG. 1 in the following description of FIG. 2.

The quantum resonator system 50 includes a first resonator 52 and a second resonator 54, that are configured as a first matched pair of resonators, as indicated by the dashed line 56. The quantum resonator system 50 also includes a third resonator 58 and a fourth resonator 60, that are configured as a second matched pair of resonators, as indicated by the dashed line 62. The first matched pair of resonators 56 can have a first resonator frequency and the second matched pair of resonators 62 can have a second resonator frequency that is unequal to the first resonator frequency. As an example, the first resonator frequency can be approximately 10 GHz and the second resonator frequency can be approximately 15 GHz.

The first and second resonators 52 and 54 can correspond to the first and second resonators 18 and 20 in the example of FIG. 1. Specifically, the quantum resonator system 50 can be configured to store a photon in one of the first and second resonators 52 and 54 to encode the quantum logic states $|1\rangle_L$ and $|0\rangle_L$, respectively. As an example, the first quantum logic state $|1\rangle_L$ can be represented by the physical quantum state $|10\rangle_P$ in which the first resonator 52 stores a photon and the second resonator 54 does not store a photon. Similarly, the second quantum logic state $|0\rangle_L$ can be represented by the physical quantum state $|01\rangle_P$ in which the second resonator 54 stores a photon and the first resonator 52 does not store a photon.

In the example of FIG. 2, the first resonator 52 and the third resonator 58 are separated by a first superconducting qubit 64, and the third resonator 58 and the second resonator 54 are separated by a second superconducting qubit 66. In addition, the second resonator 54 and the fourth resonator 60 are separated by a third superconducting qubit 68, and the fourth resonator 60 and the first resonator 52 are separated by a fourth superconducting qubit 70. As an example, the qubits 64, 66, 68, and 70 can all be configured substantially the same. As another example, the qubits 64, 66, 68, and 70 can be configured as substantially matched pairs, such that the first and third qubits 64 and 68 are substantially matched and the second and fourth qubits 66 and 70 are substantially matched. The qubits 64, 66, 68, and 70, as well as the second pair of matched resonators 62, can be configured to perform the logical X-gate to swap the quantum information between the first and second resonators 52 and 54. Specifically, the qubits 64, 66, 68, and 70 can be configured to swap the quantum information between the first and second resonators 52 and 54 via the intermediate third and fourth resonators 58 and 60.

In the example of FIG. 2, the quantum resonator system 50 includes a first parameter controller 72 and a second parameter controller 74. The first parameter controller 72 generates a control signal CCP1 that is provided to the first and third qubits 64 and 68 and the second parameter controller 74 generates a control signal CCP2 that is provided to the second and fourth qubits 66 and 70. As an example, the control signals CCP1 and CCP2 can be any of a variety of classical control parameters, such as a current, generated by the respective parameter controllers 72 and 74 that can adjust a frequency of the qubits 64, 66, 68, and 70. Thus, the signals CCP1 and CCP2 can adjust the frequency of the qubits 64, 66, 68, and 70 to manipulate a photon between the resonators 52, 54, 58, and 60. Accordingly, the qubits 64, 66, 68, and 70 are configured to perform the logical X-gate operation by rotating the photon between the resonators 52 and 54 via the intermediate third and fourth resonators 58 and 60 in response to the control signals CCP1 and CCP2. As a result, quantum resonator system 50 can substantially mitigate phase errors based on periodically performing the logical X-gate operations, similar to as described above in the example of FIG. 1.

Specifically, because the control signal CCP1 is coupled to both of the qubits 64 and 68, adjustment of the control signal CCP1 can adjust the frequency of the qubits 64 and 68 in substantially the same manner. As a result, the transfer of the quantum information between the first and third resonators 52 and 58 occurs substantially concurrently and in substantially the same manner as the transfer of quantum information between the second and fourth resonators 54 and 60. Similarly, because the control signal CCP2 is coupled to both of the qubits 66 and 70, adjustment of the control signal CCP2 can adjust the frequency of the qubits 66 and 70 in substantially the same manner. As a result, the transfer of the quantum information between the third and second resonators 58 and 54 occurs substantially concurrently and in substantially the same manner as the transfer of quantum information between the fourth and first resonators 60 and 52.

In the example above, the first pair of resonators 56 have a frequency of approximately 10 GHz and the second pair of resonators 62 have a frequency of approximately 15 GHz. Thus, the control signal CCP1 can adiabatically sweep across a range of frequencies associated with the qubits 64 and 68 from less than 10 GHz to greater than 15 GHz to transfer quantum information from the first and second resonators 52 and 54 to the third and fourth resonators 58 and 60, respectively. Similarly, the control signal CCP2 can adiabatically sweep across a range of frequencies associated with the qubits 66 and 70 from greater than 15 GHz to less than 10 GHz to transfer quantum information from the third and fourth resonators 58 and 60 to the second and first resonators 54 and 52, respectively. As a result, the control signals CCP1 and CCP2 can cooperate to rotate the photon around the arrangement of resonators 52, 54, 58, and 60 to perform the logical X-gate operations.

Figure 3:
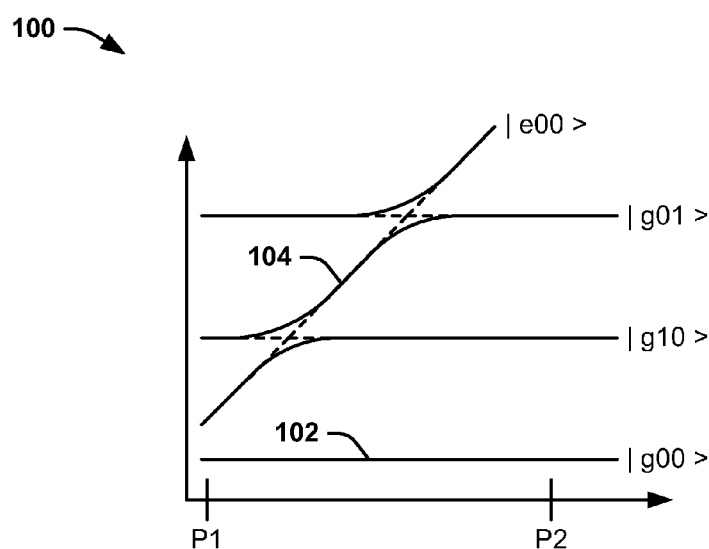
FIG. 3 illustrates an example of an energy diagram in accordance with an aspect of the invention.

FIG. 3 illustrates an example of an energy diagram 100 in accordance with an aspect of the invention. The energy diagram 100 demonstrates a graph of energy on the vertical axis and a control parameter on the horizontal axis. The energy diagram 100 can correspond to energy states of the first qubit 64 and the first and third resonators 52 and 58. Specifically, the energy states are demonstrated using conventional ket notation in which the first quantum indicator corresponds to the state of the qubit (i.e., "g" for ground state and "e" for excited state), and the second and third quantum indicators correspond to the physical quantum state (i.e., "1" for presence of a photon and "0" for ground state, as described herein) of the first and third resonators 52 and 56, respectively.

As the control signal CCP1 increases the frequency adiabatically from P1 to P2 in a sufficiently slow manner, the energy state of the first qubit 64 evolves by following the energy contours demonstrated in the energy diagram 100. As an example, P1 can correspond to a frequency that is less than 10 GHz and P2 can correspond to a frequency that is greater than 15 GHz. Thus, if the first resonator 52 begins in the ground state (i.e., "0"), the energy diagram will follow a curve 102 from P1 to P2, resulting in the third resonator 58 likewise occupying the ground state. However, if the first resonator 52 includes a photon (i.e., "1"), the energy diagram will follow a curve 104 from P1 to P2, resulting in the third resonator 58 receiving the photon from the first resonator 52. A more detailed explanation of the energy diagram 100, as well as manipulating the energy states between the first qubit 64 and the resonators 52 and 58, is described in U.S. Pat. No. 7,498,832 and U.S. application Ser. No. 12/748,923.

While the adiabatic sweeping of the frequency can result in an arbitrarily small amplitude error rate, the phase of the first qubit 64 can be expressed as:

$$\phi = \int_{t_1}^{t_2} \frac{1}{\hbar} E(x(t)) dt, \qquad \text{Equation 1}$$

Where: x corresponds to the control parameter CCP1 that is swept from $x(t_1)=P1$ to $x(t_2)=P2$.

Because the frequency of the first qubit 64 can be swept at a rate that is relatively small compared to the frequency of the first qubit 64, the resulting phase can be highly dependent upon the rate at which the frequency is swept. Thus, by using matched qubits (i.e., the first and third qubits 64 and 68 and the second and fourth qubits 66 and 70) that share common control signals (i.e., control signals CCP1 and CCP2, respectively), the phase gained by the quantum information transferred from the first resonator 52 to the third resonator 58 is approximately equal to the phase gained by the quantum information transferred from the second resonator 54 to the fourth resonator 60. Accordingly, the logical encoding scheme described herein substantially mitigates phase errors between the matched pairs of resonators (i.e., the first and second resonators 52 and 54) based on the phase of the quantum logic state $|1>_L$ remaining substantially constant relative to the phase of the quantum logic state $|0>_L$.

Referring back to the example of FIG. 2, as an example, the quantum resonator system 50 begins in the physical quantum state $|10>_P$, and thus the quantum logic state $|1>_L$, such that the first resonator 52 stores a photon and the second resonator 54 stores no photon. To perform a logical X-gate operation, the control signal CCP1 is adjusted by the first parameter controller 72 to adiabatically sweep across a range of frequencies associated with the qubits 64 and 68 from less than 10 GHz to greater than 15 GHz to transfer the photon from the first resonator 52 to the third resonator 58 while concurrently transferring the ground state (i.e., no photon) of the second resonator 54 to the fourth resonator 60. The control signal CCP2 is then adjusted by the second parameter controller 74 to adiabatically sweep across a range of frequencies associated with the qubits 66 and 70 from greater than 15 GHz to less than 10 GHz to transfer the photon from the third resonator 58 to the second resonator 54 while concurrently transferring the ground state of the fourth resonator 60 to the first resonator 52. As a result, the quantum resonator system 50 then occupies the physical quantum state of $|01>_P$ subsequent to the logical X-gate operation.

In the example of FIG. 2, the quantum resonator system 50 also includes a resonator system controller 76. The resonator system controller 76 is configured to provide a signal X to command the first and second parameter controllers 72 and 74 to adjust the respective control signals CCP1 and CCP2. In addition, the resonator system controller 76 is configured to track the stored location of the photon to maintain the intended quantum logic state of the quantum resonator system 50. For example, in the above description of the X-gate operation, the resonator system controller 76 can identify that the photon was swapped from the first resonator 52 to the second resonator 54. Thus, despite the quantum resonator system 50 occupying the physical quantum state of $|01>_P$ subsequent to the X-gate operation, the resonator system controller 76 can maintain the quantum logic state $|1>_L$ of quantum resonator system 50. As a result, the quantum system controller 76 temporarily changes the correspondence of the quantum logic state $|1>_L$ from the physical quantum state $|10>_P$ to the physical quantum state $|01>_P$. In addition, the resonator system controller 76 includes a clock 78 that can be programmed by the resonator system controller 76 to define a frequency of the periodic logical X-gate operations (e.g., 50 MHz). Thus, after a predetermined duration of time subsequent to the logical X-gate operation described above, the quantum resonator system 50 can once again perform a logical X-gate operation to transfer the photon from the second resonator 54 to the first resonator 52 in the same manner described above, as defined by the clock 78.

The photon can be loaded into the quantum resonator system 50 in a variety of ways. As an example, one or more external superconducting qubits, such as the qubit(s) 12 in the example of FIG. 1, can be coupled to a respective one or more of the resonators 52, 54, 58, and 60. Therefore, to transfer a photon into the quantum resonator system 50, an external qubit can perform a physical X-gate operation to create a photon in one of the first and second resonators 52 and 54 to set the quantum resonator system 50 in one of the quantum physical states $|10>_P$ or $|01>_P$. The one or more external qubits could include a single qubit that is coupled to one of the first and second resonators 52 and 54, such that the qubit can perform a physical X-gate operation to create the photon in the one of the first and second resonators 52 and 54 to set one physical quantum state, and the quantum resonator system 50 can perform a subsequent logical X-gate to set the other physical quantum state. Alternatively, the one or more external qubits could include separate qubits coupled to each of the first and second resonators 52 and 54 that could separately perform physical X-gate operations to set the respective physical quantum states.

As another example, the associated quantum system in which the quantum resonator system 50 is included may not include an external superconducting qubit. Instead, the quantum resonator system 50 could load the photon into one of the first and second resonators 52 and 54 by implementing a physical X-gate on one or more of the qubits 64, 66, 68, and 70. As an example, to set the quantum resonator system 50 to the physical quantum state $|10>_P$, one of the first and fourth qubits 64 and 70 could perform the physical X-gate operation in response to a control signal, such as separate from the respective control signals CCP1 and CCP2. Similarly, to set the quantum resonator system 50 to the physical quantum state $|01>_P$, one of the second and third qubits 66 and 68 could perform the physical X-gate operation in response to a control signal, such as separate from the respective control signals CCP1 and CCP2. As yet another example, one of the qubits 64, 66, 68, and 70 can perform a physical X-gate operation in response to a separate control signal to create the photon in the one of the first and second resonators 52 and 54 to set one physical quantum state, and the quantum resonator system 50 can perform a subsequent logical X-gate to set the other physical quantum state.

It is to be understood that the quantum resonator system 50 is not limited to the example of FIG. 2. As an example, the resonator system controller 76 and the clock 78 can be configured separate with respect to each other, and can be configured as a conventional processor and clock circuit, respectively. As another example, the logical X-gate operation described above is not limited to clockwise rotation around the resonators 52, 54, 58, and 60, but could instead rotate counter-clockwise around the resonators 52, 54, 58, and 60 by reversing the adjustments to the frequency of the qubits 64, 66, 68, and 70 based on the control signals CCP1 and CCP2. As another example, the quantum resonator system 50 could be configured to encode more than just two quantum logic states, but could instead encode four quantum logic states using the resonators 52, 54, 58, and 60, or could include more quantum logic states by including additional resonators and/or qubits. Therefore, the quantum resonator system 50 can be configured in a variety of ways. Furthermore, it is to be understood that the location of the photon with respect to a given opposing pair of the resonators 52, 54, 58, and 60 can be linear superposition physical quantum states, as opposed to defined locations, as described above.

Figure 4:
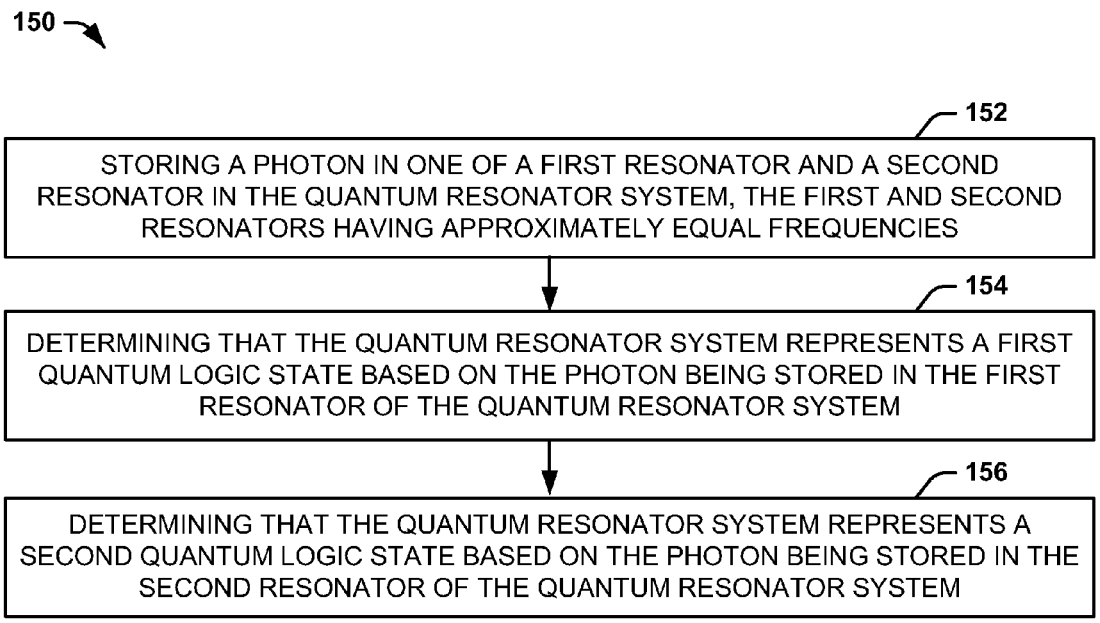
FIG. 4 illustrates an example of a method for reducing phase errors in a quantum resonator system in accordance with an aspect of the invention.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates an example of a method 150 for reducing phase errors in a quantum resonator system in accordance with an aspect of the invention. At 152, a photon is stored in one of a first resonator and a second resonator of the quantum resonator system, the first and second resonators having approximately equal resonator frequencies. At 154, it is determined that the quantum resonator system represents a first quantum logic state based on the photon being stored in the first resonator of the quantum resonator system. The second resonator of the quantum resonator system can be in the ground state in the first quantum logic state. The storage of the photon can occur as a result of a physical X-gate operation associated with the qubit.

At 156, it is determined that the quantum resonator system represents a second quantum logic state based on the photon being stored in the second resonator of the quantum resonator system. The first resonator of the quantum resonator system can be in the ground state in the second quantum logic state. A logical X-gate operation can be periodically performed to swap storage of the photon between the first resonator and the second resonator to substantially mitigate phase errors associated with the quantum resonator system based on a predefined clock frequency. The logical X-gate can include rotating the photon around a ring of four resonators that include the first and second resonators, as well as associated interconnecting qubits, to swap the quantum information between the first and second resonators.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

What is claimed is:

1. A quantum system comprising:
    a superconducting qubit that is controlled by a control parameter to manipulate a photon for performing quantum operations; and
    a quantum resonator system coupled to the superconducting qubit and comprising a first resonator and a second resonator having approximately equal resonator frequencies, the quantum resonator system representing a first quantum logic state based on a first physical quantum state of the first and second resonators with respect to storage of the photon and a second quantum logic state based on a second physical quantum state of the first and second resonators with respect to storage of the photon.

2. The system of claim 1, wherein the first physical quantum state is defined as the photon being stored in the first resonator and no photons being stored in the second resonator, and wherein the second physical quantum state is defined as the photon being stored in the second resonator and no photons being stored in the first resonator.

3. The system of claim 1, wherein the first and second resonators are configured as transmission line resonators formed from a coplanar waveguide, a microstrip waveguide, a strip line waveguide, or a slot line waveguide.

4. The system of claim 1, wherein the quantum resonator system is further configured to periodically perform a logical X-gate operation to swap storage of quantum information associated with the photon between the first resonator and the second resonator to substantially mitigate phase errors associated with the quantum resonator system, the quantum resonator system tracking the storage of the quantum information associated with the photon to maintain the respective representation of one of the first and second quantum logic states regardless of in which of the first and second resonators the photon is stored.

5. The system of claim 4, wherein the quantum resonator system comprises a clock configured to define a frequency of the periodic swapping of the storage of the photon between the first resonator and the second resonator.

6. The system of claim 4, wherein the first and second resonators each have a first resonator frequency, wherein the quantum resonator system further comprises a third resonator and a fourth resonator each having a second resonator frequency that is not equal to the first resonator frequency, the quantum resonator system periodically swapping storage of quantum information associated with the photon between the first resonator and the second resonator via the respective third and fourth resonators.

7. The system of claim 6, wherein the quantum resonator system further comprises:
    a first pair of superconducting qubits that interconnect the first and third resonators and the second and fourth resonators, respectively, that are controlled by a first control signal to transfer the quantum information from the first resonator to the third resonator and from the second resonator to the fourth resonator, respectively; and
    a second pair of superconducting qubits that interconnect the second and third resonators and the fourth and first resonators, respectively, that are controlled by a second control signal to move the quantum information from the second resonator to the third resonator and from the second resonator to the fourth resonator, respectively.

8. The system of claim 7, wherein the first resonator frequency is less than the second resonator frequency, wherein the first control signal is configured to adiabatically sweep a resonant frequency of the first pair of superconducting qubits from a first frequency that is less than the first resonant frequency to a second frequency that is greater than the second resonator frequency to substantially concurrently transfer the quantum information from the first resonator to the third resonator and from the second resonator to the fourth resonator, respectively, and wherein the second control signal is configured to adiabatically sweep a resonant frequency of the second pair of superconducting qubits from the second frequency to the first frequency to substantially concurrently transfer the quantum information from the third resonator to the second resonator and from the fourth resonator to the first resonator, respectively.

9. A method for reducing phase errors in a quantum resonator system, the method comprising:
    storing a photon in one of a first resonator and a second resonator of the quantum resonator system, the first and second resonators having approximately equal resonator frequencies;
    determining that the quantum resonator system represents a first quantum logic state based on the photon being stored in the first resonator of the quantum resonator system; and
    determining that the quantum resonator system represents a second quantum logic state based on the photon being stored in the second resonator of the quantum resonator system.

10. The method of claim 9, wherein storing the photon in the second resonator comprises:

storing the photon in the first resonator; and
swapping quantum information between the first and second resonators.

11. The method of claim 9, wherein storing the photon in one of the first and second resonators comprises performing a physical X-gate operation on the one of the first and second resonators via one of a first and second superconducting qubit associated with the quantum resonator system and coupled to the first and second resonators, respectively.

12. The method of claim 9, further comprising:
periodically performing a logical X-gate operation to swap storage of quantum information associated with the photon between the first resonator and the second resonator to substantially mitigate phase errors associated with the quantum resonator system; and
tracking the storage of the quantum information associated with the photon to maintain the respective representation of one of the first and second quantum logic states regardless of in which of the first and second resonators the photon is stored.

13. The method of claim 12, wherein the first and second resonators each have a first resonator frequency, wherein periodically performing the logical X-gate operation comprises:
transferring quantum information associated with the first resonator to a third resonator having a second resonator frequency;
transferring quantum information associated with the second resonator to a fourth resonator having the second resonator frequency substantially concurrently with the transferring of the quantum information of the first resonator to the third resonator, the third and fourth resonators each having a second resonator frequency that is unequal to the first resonator frequency;
transferring the quantum information associated with the fourth resonator to the first resonator; and
transferring the quantum information associated with the third resonator to the second resonator substantially concurrently with the transferring of the quantum state of the fourth resonator to the first resonator.

14. The method of claim 13, wherein transferring the quantum information associated with the first and second resonators to the third and fourth resonators, respectively, comprises adjusting a first control signal associated with a first pair of superconducting qubits that interconnect the first and third resonators and the second and fourth resonators, respectively, and wherein transferring the quantum information associated with the third and fourth resonators to the second and first resonators, respectively, comprises adjusting a second control signal associated with a second pair of superconducting qubits that interconnect the second and third resonators and the first and fourth resonators, respectively.

15. The method of claim 14, wherein the first resonator frequency is less than the second resonator frequency, wherein adjusting the first control signal comprises adiabatically sweeping a resonant frequency of the first pair of superconducting qubits from a first frequency that is less than the first resonant frequency to a second frequency that is greater than the second resonator frequency to substantially concurrently transfer the quantum information from the first resonator to the third resonator and from the second resonator to the fourth resonator, respectively, and wherein adjusting the second control signal comprises adiabatically sweeping a resonant frequency of the second pair of superconducting qubits from the second frequency to the first frequency to substantially concurrently transfer the quantum information from the third resonator to the second resonator and from the fourth resonator to the first resonator, respectively.

16. A quantum system comprising:
a superconducting qubit that is controlled by a control parameter to manipulate a photon for performing quantum operations; and
a quantum resonator system coupled to the superconducting qubit and comprising a first resonator and a second resonator having approximately equal resonator frequencies, the quantum resonator system representing a first quantum logic state based on storing the photon in the first resonator and a second quantum logic state based on storing the photon in the second resonator, the quantum resonator system being configured to periodically swap storage of the photon between the first resonator and the second resonator to substantially mitigate phase errors associated with the quantum resonator system.

17. The system of claim 16, wherein the quantum resonator system further comprises:
a controller to track the storage of the photon to maintain the respective representation of one of the first and second quantum logic states regardless of in which of the first and second resonators the photon is stored; and
a clock configured to define a frequency of the periodic swapping of the storage of the photon between the first resonator and the second resonator.

18. The system of claim 16, wherein the first and second resonators each have a first resonator frequency, wherein the quantum resonator system further comprises a third resonator and a fourth resonator each having a second resonator frequency that is not equal to the first resonator frequency, the quantum resonator system periodically swapping storage of the photon between the first resonator and the second resonator via the respective third and fourth resonators.

19. The system of claim 18, wherein the quantum resonator system further comprises:
a first pair of superconducting qubits that interconnect the first and third resonators and the second and fourth resonators, respectively, that are controlled by a first control signal to transfer quantum information from the first resonator to the third resonator and from the second resonator to the fourth resonator, respectively; and
a second pair of superconducting qubits that interconnect the second and third resonators and the fourth and first resonators, respectively, that are controlled by a second control signal to move quantum information from the second resonator to the third resonator and from the second resonator to the fourth resonator, respectively.

20. The system of claim 19, wherein the first resonator frequency is less than the second resonator frequency, wherein the first control signal is configured to adiabatically sweep a resonant frequency of the first pair of superconducting qubits from a first frequency that is less than the first resonant frequency to a second frequency that is greater than the second resonator frequency to substantially concurrently transfer the quantum information from the first resonator to the third resonator and from the second resonator to the fourth resonator, respectively, and wherein the second control signal is configured to adiabatically sweep a resonant frequency of the second pair of superconducting qubits from the second frequency to the first frequency to substantially concurrently transfer the quantum information from the third resonator to the second resonator and from the fourth resonator to the first resonator, respectively.

* * * * *